US006492457B2

(12) United States Patent
Dworak et al.

(10) Patent No.: US 6,492,457 B2
(45) Date of Patent: Dec. 10, 2002

(54) TWO-COMPONENT SYSTEMS BASED ON WATER-SOLUBLE POLYESTERS AND BLOCKED ISOCYANATES FOR AQUEOUS BAKING VARNISHES

(75) Inventors: Gert Dworak, Graz (AT); Roland Feola, Graz (AT); Johann Gmoser, Graz (AT); Ulrike Kuttler, Vasoldsberg (AT)

(73) Assignee: Solutia Austria GmbH, Werndorf (AT)

( * ) Notice: Subject to any disclaimer, the term of this patent is extended or adjusted under 35 U.S.C. 154(b) by 0 days.

(21) Appl. No.: 09/975,424

(22) Filed: Oct. 11, 2001

(65) Prior Publication Data

US 2002/0082336 A1 Jun. 27, 2002

(30) Foreign Application Priority Data

Oct. 17, 2000 (AT) ............................................... 1781/00

(51) Int. Cl.$^7$ .............................. C08J 3/00; C08K 3/20; C08L 75/00; C08F 20/00
(52) U.S. Cl. ....................... 524/591; 524/839; 524/840; 525/440
(58) Field of Search ................................ 524/591, 839, 524/840; 525/440

(56) References Cited

U.S. PATENT DOCUMENTS 5,494,956 A * 2/1996 Dworak et al.

FOREIGN PATENT DOCUMENTS

| AT | 2173/99 | 1/2000 |
|----|---------|--------|
| EP | 0 218 906 A2 | 4/1987 |
| EP | 0 367 051 A1 | 5/1990 |
| EP | 0 406 210 A2 | 7/1992 |
| EP | 0 537 568 A2 | 4/1993 |
| EP | 0 653 468 A2 | 5/1995 |
| JP | 07 018 501 | 12/1966 |
| JP | 63 135 447 | 2/1988 |
| JP | 01 207 373 | 3/1989 |
| JP | 05 105 737 | 4/1993 |
| RU | 2 057 602 | 2/1997 |
| SU | 761 536 | 2/1981 |
| WO | 93/01245 A1 | 1/1993 |

OTHER PUBLICATIONS

Houben–Weyl, *Methoden der Organischen Chemie*, Bd. XIV/2, Makromolekulare Stoffe, 4. Aufl., 1963, S. 62+63.

* cited by examiner

*Primary Examiner*—Patrick D. Niland
(74) *Attorney, Agent, or Firm*—ProPat, L.L.C.

(57) ABSTRACT

Aqueous two-component binder systems, its first component comprising a water-soluble polyester AB and its second component comprising a blocked polyfunctional isocyanate C, where the blocking agent C2 is selected from the group consisting of primary alcohols C21 having 3 to 10 carbon atoms, in which the carbon atom adjacent to the hydroxymethylene group carries a double bond, oximes C22 of linear, branched or cyclic aliphatic ketones having 3 to 15 carbon atoms, CH-acidic compounds C23, in which the carbon atom carrying the active hydrogen carries at least one further group selected from $R^1$—CO—, $R^2$—O—CO—, —$NO_2$ and $R^3$—$SO_2$—, $R^1$, $R^2$ and $R^3$ independently of one another may be linear, branched or cyclic alkyl groups having 1 to 18 carbon atoms or aryl groups having from 5 to 15 carbon atoms, and NH-acidic compounds C24.

10 Claims, No Drawings

TWO-COMPONENT SYSTEMS BASED ON WATER-SOLUBLE POLYESTERS AND BLOCKED ISOCYANATES FOR AQUEOUS BAKING VARNISHES

FIELD OF THE INVENTION

The invention relates to two-component systems comprising water-soluble polyesters and blocked isocyanates that are suitable as binders for aqueous baking varnishes.

BACKGROUND OF THE INVENTION

Baking varnishes comprise reactive resin binders and curatives which only on baking, i.e., at relatively high temperatures, react with the reactive groups of the resins to form crosslinked structures. Aqueous baking binders are known, for example, from EP-A 0 218 906, which describes combinations of copolymers of free-radically polymerizable monomers and crosslinker resins such as amino resins, phenolic resins or blocked isocyanates. Blocking agents mentioned for the isocyanates are aliphatic and aromatic monoalcohols such as methanol, ethanol, butanol, (cyclo) hexanol and benzyl alcohol, oximes, lactams and phenols. The binder is a water-dilutable mixture comprising mass fractions of from 60 to 95% of the copolymer and from 40 to 5% of the crosslinker. By adding pigments it is also possible to prepare pigmented paints possessing high storage stability. The blocking of the isocyanates is so efficient that the crosslinking reaction in the mixture does not proceed with any notable speed at standard (room) temperature.

EP-A 0 496 210 discloses two-component systems for producing baking coatings which comprise aqueous/organic solutions of anionically modified polyacrylate resins and organic polyisocyanates which are not blocked and therefore no blocking agents are liberated on curing.

According to EP-A 0 537 568, certain aqueous polyester resins containing sulfonate and hydroxyl groups may be formulated to aqueous two-component binders using polyfunctional isocyanates containing free isocyanate groups as curatives. Water-dilutable paints in the form of two-component systems based on water-soluble polyesters or other water-soluble resins and unblocked isocyanates in combination with water-soluble or water-dispersible, partially etherified amino resins are known from Austrian patent application A-2173/99.

When unblocked isocyanates are used, however, a number of disadvantages arise. For instance, in the paint, the aqueous solvent always competes with the OH groups of the resin for reaction with the unblocked isocyanate groups within the processing period. This activity may lead on the one hand to formation of unwanted secondary products (by reaction of water and isocyanate, substantially amines, and subsequently ureas); on the other hand, the carbon dioxide formed when the isocyanates are decomposed by the action of water produces gas bubbles which often result in defects in the baked paint film. The secondary products formed (amines, ureas) may also additionally impair the properties of the baked paint film.

The losses of isocyanate groups as a result of secondary reactions are normally compensated by using stoichiometric excess—often considerable—of the isocyanates. This is economically undesirable. The processing of unblocked isocyanates in the two-component process, moreover, also presents workplace hygiene (toxicological) problems.

In practice, usually unblocked, polyfunctional aliphatic isocyanates are used in two-component systems. The reaction between water and the unblocked aromatic isocyanates is generally so rapid that processing within the necessary time is impossible. Aromatic unblocked isocyanates are therefore not usually used for a 2K application.

SUMMARY OF THE INVENTION

It has been found that not only aliphatic but also aromatic polyfunctional isocyanates can in fact be used in two-component systems if they are blocked with blocking agents which lead to highly reactive reaction products which undergo deblocking at comparatively low baking temperatures. The isocyanates blocked in this way may be so reactive that formulation with water-soluble, hydroxyl group-containing resins (e.g., polyesters) in the form of one-component systems is no longer possible because of their instability to hydrolysis. On the other hand, curing of two-component paints which comprise these isocyanates to give crosslinked films is possible at baking temperatures which are all the lower. Compounds which have been found particularly appropriate for use as blocking agents are highly activated C–H acidic compounds, certain reactive alcohols, and certain oximes, as elucidated later on below. Similar adducts with aliphatic isocyanates are described for example in Houben-Weyl, Methoden der Organischen Chemie, Vol. XIV/2, Makromolekulare Stoffe [macromolecular substances], $4^{th}$ ed. 1963, pages 62 and 63.

The present invention therefore provides aqueous two-component binders, its first component comprising a water-dilutable polyester AB having a hydroxyl number of at least 10 mg/g and its second component comprising a blocked polyfunctional isocyanate C, wherein the blocked isocyanate C is prepared by reaction of an aromatic isocyanate C1 and a blocking agent C2 for the isocyanate, C2 being selected from primary alcohols C21 having 3 to 10 carbon atoms, in which the carbon atom adjacent to the hydroxymethylene group carries a double bond, oximes C22 of linear, branched or cyclic aliphatic ketones having 3 to 15 carbon atoms, CH-acidic compounds C23, in which the carbon atom which carries the active hydrogen carries at least one further group selected from $R^1$—CO—, $R^2$—O—CO—, —$NO_2$ and $R^3$—$SO_2$—, $R^1$, $R^2$ and $R^3$ independently of one another denoting linear, branched or cyclic alkyl groups having 1 to 18 carbon atoms or aryl groups having 5 to 15 carbon atoms, and NH-acidic compounds C24 such as, for example, 3,5-dimethylpyrazole, succinimide or phthalimide. Examples of suitable blocking agents C21 are hydroxyacetone, allyl alcohol, 2-methylallyl alcohol (β-methallyl alcohol), 3-methyl-2-buten-1-ol, 2-penten-1-ol and 2-hexen-1-ol. Examples of suitable blocking agents C22 are the oximes of acetone, 2-butanone, 2- and 3-pentanone and methyl isobutyl ketone. Particularly suitable blocking agents C23 are acetyl acetone, acetoacetates, malonates and cyanoacetates.

DETAILED DESCRIPTION OF THE PREFERRED EMBODIMENTS

The water-dilutable polyesters AB may be prepared either conventionally by polycondensation of polyfunctional, especially difunctional, organic hydroxy compounds AB1 and polyfunctional, especially difunctional, organic acids AB2 or by partial condensation of hydroxyl group-containing compounds B which per se are insoluble in water with organic compounds A containing acid groups, especially carboxyl groups. The compounds A are per se soluble in water or dispersible in water following at least partial neutralization of the acid groups. Partial condensation means here that the reaction of the compounds A and B is conducted to a point such that the resulting condensation product AB still contains both hydroxyl groups and acid groups. The amount of the acid groups in AB corresponds preferably to an acid number of from about 10 to 60 mg/g, preferably from 15 to 55, and in particular from 20 to 50 mg/g. The amount of the hydroxyl groups in AB corresponds to a hydroxyl number of at least 10 mg/g, preferably from 15 to 200 mg/g, and in particular from 25 to 150 mg/g. The polycondensate AB normally has a Staudinger index $J_0$ of from 5 to 25 cm$^3$/g, preferably from 7 to 22, and in particular from 10 to 20 cm$^3$/g, as measured in dimethylformamide at 20° C.

A substance termed "water-soluble" here is one which in contact with ten times the amount of water at room temperature (20° C.) is dissolved in the aqueous phase to an extent such that the mass fraction of this substance in the aqueous phase after equilibrium has been reached is not less than 1%. A substance termed "water-dispersible" is one which with ten times the mass of water forms—under shearing—a dispersion which when stored at room temperature shows no macroscopic separation over a period of 14 days. Substances referred to as "water-dilutable" are soluble in water and/or dispersible in water.

The compounds or resins A containing carboxyl groups are preferably selected from polyester resins A1, polyurethane resins A2, the so-called maleate oils A3, fatty acids and fatty acid mixtures A4 grafted with unsaturated carboxylic acids, and acrylate resins A5. Instead of or in a mixture with resins containing carboxyl groups, it is also possible to use epoxy resins modified with phosphoric acid and/or phosphonic acids, or similarly modified reaction products of epoxy resins with fatty acids, referred to collectively as A6. Preferably, the acid number of the resins A is from 100 to 230 mg/g, in particular from 70 to 160 mg/g. Their Staudinger index, measured in dimethylformamide as solvent at 20° C., is generally from about 6.5 to 12 cm$^3$/g, preferably from 8 to 11 cm$^3$/g.

Suitable polyester resins A1 may be prepared in a conventional manner from polyols A11 and polycarboxylic acids A12, where optionally some—preferably up to 25%—of the amount of substance of the polyols and polycarboxylic acids can be replaced by hydroxycarboxylic acids A13. By appropriate choice of the type and amount of the starting materials A11 and A12 it is ensured that the resulting polyester has a sufficient number of acid groups, in accordance with the acid number indicated above. The polyols A11 are preferably selected from the aliphatic and cycloaliphatic alcohols having 2 to 10 carbon atoms and on average at least two hydroxyl groups per molecule; glycol, 1,2- and 1,3-propanediol, 1,4-butanediol, 1,6-hexanediol, neopentyl glycol, di- and triethylene glycol, di- and tripropylene glycol, glycerol, trimethylolpropane and trimethylolethane are particularly suitable. Suitable polycarboxylic acids A12 are aliphatic, cycloaliphatic and aromatic polycarboxylic acids such as adipic acid, succinic acid, cyclohexane-dicarboxylic acid, phthalic acid, isophthalic and terephthalic acid, trimellitic acid, trimesic acid and benzophenonetetracarboxylic acid. It is also possible to use compounds having both carboxylic acid groups and sulfonic acid groups, such as sulfoisophthalic acid, for example.

Suitable polyurethane resins A2 may be prepared by reacting aliphatic polyols A21, as defined under A11, hydroxyalkanecarboxylic acids A22 having at least one, preferably two, hydroxyl groups and a carboxyl group which under esterification conditions is less reactive than adipic acid; preference is given to the use of dihydroxymonocarboxylic acids selected from dimethylol-acetic acid, dimethylolbutyric acid and dimethylol-propionic acid; oligomeric or polymeric compounds A25 having on average at least two hydroxyl groups per molecule, which may be selected from polyether polyols A251, polyester polyols A252, polycarbonate polyols A253, saturated and unsaturated dihydroxy-aliphatic compounds A254, which are obtainable by oligomerizing or polymerizing dienes having 4 to 12 carbon atoms, especially butadiene, isoprene and dimethylbutadiene, followed by functionalization in a known manner, and also polyfunctional isocyanates A23, selected preferably from aromatic, cycloaliphatic and also linear and branched aliphatic difunctional isocyanates such as tolylene diisocyanate, bis(4-isocyanatophenyl)methane, tetramethylxylylene diisocyanate, isophorone diisocyanate, bis(4-isocyanatocyclohexyl)methane, hexamethylene diisocyanate and 1,6-diisocyanato-3,5,5- and -3,5,5-trimethylhexane.

Particular preference is given to those polyurethane resins A2 which are prepared by reacting a mixture of one or more polyols A21 with a hydroxyalkanecarboxylic acid A22 and at least one polyfunctional isocyanate A23 which has been at least partly blocked, usually to the extent of more than 20%, preferably to the extent of more than 35% and, in particular, to the extent of 50% or more with monohydroxy compounds A24 selected from polyalkylene glycol monoalkyl ethers HO—($R^1$—O)$_n$—$R^2$, where $R^1$ is a linear or branched alkylene radical having 2 to 6, preferably 2 to 4 carbon atoms and $R^2$ is an alkyl group having 1 to 8, preferably 2 to 6 carbon atoms, n being a number between 2 and 10, and oximes of aliphatic ketones having 3 to 9 carbon atoms. The degree of blocking is stated here as the ratio of the number of blocked isocyanate groups to the total number of isocyanate groups (blocked and unblocked) present in the isocyanate A23. It is further preferred to prepare the polyurethane resins A21 by reacting a mixture of a polyfunctional isocyanate and a polyfunctional isocyanate blocked as described above with the hydroxyalkanecarboxylic acid A22 and the polyols A21 and A25, the mixing ratios being chosen so that each molecule of the polyurethane A21 contains on average one or more than one terminal blocked isocyanate group.

"Maleate oil" A3 is a term used to denote reaction products of (drying) oils A31 and olefinically unsaturated carboxylic acids A32, especially dicarboxylic acids. Oils A31 used are preferably drying and semidrying oils such as linseed oil, tallow oil, rapeseed oil, sunflower oil and cottonseed oil, having iodine numbers of from about 100 to about 180 cg/g. The unsaturated carboxylic acids A32 are selected so that under the customary conditions they graft free-radically (following addition of initiators or following heating) onto the initial charge of oils with a yield (fraction of the unsaturated carboxylic acids bonded to the oil after the reaction, based on the amount used for the reaction) of more than 50%. Particularly suitable is maleic acid in the form of its anhydride, as are tetrahydrophthalic anhydride, acrylic acid and methacrylic acid, and also citraconic acid, mesaconic acid and itaconic acid.

Equally suitable resins A4 are fatty acids or fatty acid mixtures A41 grafted with the unsaturated acids specified under A32, said fatty acids or fatty acid mixtures A41 being obtainable in industrial amounts by saponification of fats. The suitable fatty acids have at least one olefinic double bond in the molecule; those which may be listed by way of example include oleic acid, linoleic and linolenic acid, ricinoleic acid and elaidic acid, and also the stated technical grade mixtures of such acids.

Further suitable resins A5 are the acidic acrylate resins obtainable by copolymerization of olefinically unsaturated carboxylic acids A51 and other vinyl or acrylic monomers A52. The carboxylic acids are those already mentioned under A32, and also vinylacetic acid and also crotonic and isocrotonic acid and the monoesters of olefinically unsaturated dicarboxylic acids, such as monomethyl maleate and monomethyl fumarate, for example. Suitable monomers A52 are the alkyl esters of acrylic and methacrylic acid having preferably 1 to 8 carbon atoms in the alkyl group, (meth)acrylonitrile, hydroxyalkyl (meth)acrylates having 2 to 6 carbon atoms in the alkyl group, styrene, vinyltoluene, and also vinyl esters of aliphatic linear and branched carboxylic acids having 2 to 15 carbon atoms, especially vinyl acetate and the vinyl ester of a mixture of branched aliphatic carboxylic acids having on average 9 to 11 carbon atoms. It is also advantageous to copolymerize the monomers specified under A51 and A52 in the presence of compounds A53 which react with the unsaturated carboxylic acids with addition and formation of a carboxyl- or hydroxyl-functional, copolymerizable compound. Examples of such compounds are lactones A531, which react with the carboxylic acids A51 with ring opening to form a carboxyl-functional unsaturated compound, and epoxides A532, especially glycidyl esters of α-branched saturated aliphatic monocarboxylic acids having 5 to 12 carbon atoms, such as of neodecanoic acid or neopentanoic acid, which react with the acid A51 with addition to give a copolymerizable compound containing a hydroxyl group. The amounts of substance of the compounds used should be such that the required acid number is reached. If this compound A53 is introduced as the initial charge and the polymerization is conducted so that this compound is used as (sole) solvent, solvent-free acrylate resins are obtained.

The epoxy resins modified with phosphoric acid or phosphonic acids or with likewise-modified adducts of epoxy resins and fatty acids, A6, are prepared by reacting phosphoric acid or organic phosphonic acids which are at least dibasic with epoxy resins or adducts of epoxy resins and fatty acids, preferably in a solvent. The amount of substance of the phosphoric or phosphonic acid used is normally such that all of the epoxide groups are consumed by the reaction with the acid and such that a sufficient number of acid groups is still available after the reaction. The resulting resin has hydroxyl groups (from the reaction of the oxirane group with the acid function), these hydroxyl groups being positioned β to the ester group, and also acid groups of the phosphoric or phosphonic acid which were not consumed by the reaction with the epoxide. Examples of suitable phosphoric or phosphonic acids are orthophosphoric acid $H_3PO_4$, phosphorous acid $H_3PO_3$, and alkanephosphonic acids having 1 to 18, especially 1 to 6, carbon atoms.

Suitable hydroxyl group-containing compounds or resins B are, in particular, polyesters B1, acrylate resins B2, polyurethane resins B3 and epoxy resins B4. The hydroxyl number of the resins B is generally from about 50 to 500 mg/g, preferably from about 60 to 350 mg/g, and with particular preference from 70 to 300 mg/g. Their Staudinger index, measured at 20° C. in dimethylformamide as solvent, is preferably from 8 to 13 cm³/g, in particular from 9.5 to 12 cm³/g.

Like the component A1, the polyesters B1 are prepared by polycondensation; in this case all that is necessary is to select the type and amount of the starting materials such that there is an excess of hydroxyl groups over the acid groups, as the condensation product needs to have the hydroxyl number indicated above. This may be achieved by using polyhydric alcohols containing on average at least two, preferably at least 2.1, hydroxyl groups per molecule, with dicarboxylic acids or with a mixture of polycarboxylic and monocarboxylic acids containing on average not more than two, preferably from 1.5 to 1.95, acid groups per molecule. Another possibility is to use a corresponding excess of hydroxyl components (polyols) B11 over the acids B12. The polyols B11 and the polyfunctional acids B12 which are reacted in the polycondensation reaction to give the hydroxyl group-containing polyesters B1 are selected from the same groups as the polyols A11 and the acids A12. It is likewise possible here to replace some of the polyols and acids by hydroxy acids in accordance with A13. The aim is for the acid number of component B not to exceed 20 mg/g and to be preferably below 18 mg/g. The acid number may be reduced, for example, by reacting the condensed polyester B1 with a small amount of monohydric aliphatic alcohols A14 under esterification conditions. The amount of alcohols A14 is such that, although the acid number is reduced below the limit, the Staudinger index does not fall below the stated lower limit. Examples of suitable aliphatic alcohols are n-hexanol, 2-ethylhexanol, isodecyl alcohol and tridecyl alcohol.

The hydroxyl group-containing acrylate resins B2 are obtainable by usually free-radically initiated copolymerization of hydroxyl group-containing acrylic monomers B21 with other vinyl or acrylic monomers B22 without such functionality. Examples of the monomers B21 are esters of acrylic and methacrylic acid with aliphatic polyols, especially diols having 2 to 10 carbon atoms, such as hydroxyethyl and hydroxypropyl (meth)acrylate. Examples of the monomers B22 are the alkyl esters of (meth)acrylic acid with 1 to 10 carbon atoms in the alkyl group, such as methyl, ethyl, n-butyl and 2-ethylhexyl (meth)acrylate, (meth)acrylonitrile, styrene, vinyltoluene, vinyl esters of aliphatic monocarboxylic acids having 1 to 10 carbon atoms, such as vinyl acetate and vinyl propionate. Preference is also given to those acrylate resins prepared not, as is usual, in solution but instead in a bulk polymerization in which the initial charge comprises a liquid cyclic compound which acts as solvent during the polymerization reaction and which by means of ring opening forms a copolymerizable compound on reaction with one of the monomers used. Examples of such compounds are glycidyl esters of α-branched aliphatic monocarboxylic acids, especially the acids or acid mixtures available commercially as neopentanoic acid or neodecanoic acid, and also lactones such as ε-caprolactone or δ-valerolactone. Where these glycidyl esters are used, it is necessary during the polymerization to use comonomers containing acid groups, such as (meth)acrylic acid, in a fraction which is at least equimolar to the amount of substance of the epoxide groups. The lactones may be used, with ring opening, both with hydroxyl group-containing comonomers and with comonomers containing acid groups.

Hydroxyl group-containing polyurethane resins B3 are obtainable in a known manner by addition of oligomeric or polymeric polyols B31, selected from polyester polyols, polyether polyols, polycarbonate polyols and polyolefin polyols, and, if desired, low molar mass aliphatic diols or polyols B33 having 2 to 12 carbon atoms, such as ethylene glycol, 1,2- and 1,3-propylene glycol, 1,4-butanediol, 1,6-hexanediol, di- and triethylene and/or propylene glycol, neopentyl glycol, trimethylolpropane, pentaerythritol, and polyfunctional isocyanates B32, the latter being used in a substoichiometric amount such that the number of hydroxyl groups in the reaction mixture is greater than the number of isocyanate groups. Suitable polyols are, in particular, oligomeric and polymeric dihydroxy compounds having a number-average molar mass $M_n$ of from about 200 to 10000 g/mol. By means of polyaddition with polyfunctional, especially difunctional, isocyanates, they are built up to the target value for the Staudinger index of at least 8 cm³/g, preferably at least 9.5 cm³/g.

Epoxy resins B4 obtainable by reacting epichlorohydrin with aliphatic or aromatic diols or polyols, especially bisphenol A, bisphenol F, resorcinol, novolaks or oligomeric polyoxyalkylene glycols having 2 to 4, preferably 3, carbon atoms in the alkylene group have at least one hydroxyl group per epichlorohydrin molecule used. Instead of the reaction of epichlorohydrin with diols it is also possible to prepare the appropriate epoxy resins by the so-called advancement reaction from diglycidyl ethers of diols (such as those mentioned above) or diglycidyl esters of dibasic organic acids with the stated diols. All known epoxy resins may be used here, provided they satisfy the condition for the hydroxyl number.

On its own, the blocked isocyanate C is preferably not water-soluble or water-dispersible. It can be prepared by reacting the aforementioned blocking agents C2 with polyfunctional isocyanates C1 which are aromatic (i.e., the isocyanate groups are each attached to an aromatic carbon atom) and contain at least two, preferably from 2 to 4, isocyanate groups per molecule. Examples that may be mentioned of the preferred aromatic polyfunctional isocyanates are 1,3-phenylene diisocyanate, 1,4-phenylene diisocyanate, 2,4-tolylene diisocyanate (2,4-TDI), 2,6-tolylene diisocyanate (2,6-TDI), and mixtures (TDI) of these isomers, 4,4'-biphenylene diisocyanate, 1,5-naphthylene diisocyanate, 1,4-naphthylene diisocyanate, 4,4'-diisocyanatodiphenyl ether, and bis(4-isocyanatophenyl) methane (MDI) which may be reacted further with at least trihydric linear or branched aliphatic alcohols to give oligomeric compounds, which then contain preferably from 2 to 4 isocyanate groups per molecule. Examples of suitable polyhydric alcohols which are intended to result in highly hydrolysis-stable bonds include glycerol, trimethylolpropane, trimethylolethane, pentaerythritol, dimethylolpropane and -ethane. Uretdiones and isocyanurates of above diisocyanates, allophanates and biurets derived from above diisocyanates, and mixtures of such di- or polyisocyanates may likewise be used. Particular preference is given to the diisocyanates, especially TDI, and to the uretdiones, isocyanurates, allophanates and biurets derived from them.

Depending on the performance requirements it is also possible to use aliphatic isocyanates such as hexamethylene diisocyanate instead of the aromatic isocyanates preferred here—in that case the baking temperatures required for curing will of course be higher.

The two-component systems of the invention are mixed immediately prior to application. The pot life of the mixtures is more than 8 hours. The customary additives, known in paint technology, may be added to these mixtures.

The two-component binders of the invention can be used to formulate coating materials for substrates such as metal, wood, plastics, mineral substrates such as clay, concrete, unglazed porcelain, or else for cardboard. Preference is given to their use as binders for clearcoat materials on metallic substrates; in this application the varnish films formulated with binders of the invention exhibit particularly good adhesion.

It is also possible to replace some of the blocked isocyanate groups by water-soluble melamine resins or other amino resins which react when heated with the hydroxyl groups of the polyester AB, with crosslinking. In this case, on heating, curing takes place in a number of stages, with the isocyanate-induced curing which begins even at a relatively low temperature being able to prevent running of the pre-crosslinked coating film on inclined surfaces. The amino resins, especially melamine resins, may be added to the polyester component or, preferably, to the blocked isocyanates. In these compositions the mass fractions of solids in the binder mixture are preferably from 60 to 90% for the component AB, from 10 to 40% for the blocked isocyanates C, and from 0 to 15% for the amino resin component.

EXAMPLES

The examples illustrate the invention without restricting it in its scope. In the examples below, as in the text which precedes them, all figures with the unit "%" (=g/(100 g) or cg/g) are mass fractions (ratio of the mass of the substance in question to the mass of the mixture), unless otherwise indicated. Concentration figures in "%" are mass fractions of the dissolved substance in the solution (mass of the dissolved substance divided by the mass of the solution).

The acid number is defined in accordance with DIN 53 402 as the ratio of the mass $m_{KOH}$ of potassium hydroxide required to neutralize a sample under analysis to the mass $m_B$ of this sample (mass of the solids in the sample in the case of solutions or dispersions); its customary unit is "mg/g".

The hydroxyl number is defined in accordance with DIN 53 240 as the ratio of that mass $m_{KOH}$ of potassium hydroxide which has exactly the same number of hydroxyl groups as a sample under analysis to the mass $m_B$ of this sample (mass of the solids in the sample in the case of solutions or dispersions); its customary unit is "mg/g".

The iodine number is defined in accordance with DIN 53 241-1 as a ratio of that mass $m_I$ of iodine which is added onto the olefinic double bonds of a sample under analysis, and is discolored in the process, to the mass $m_B$ of this sample (mass of the solids in the sample in the case of solutions or dispersions); its customary unit is "g/(100 g)" or "cg/g".

The formerly so-called "intrinsic viscosity number", known as the "Staudinger index" according to DIN 1342 Part 2.4, $J_g$, is the limiting value of the Staudinger function $J_v$ at decreasing concentration and shear stress, $J_v$ being the relative change in viscosity based on the mass concentration $\beta_B = m_B/V$ of the dissolved substance B (with the mass $m_B$ of the substance in the volume V of the solution); i.e., $J_v = (\eta_r - 1)/\beta_B$. Here, $\eta_r - 1$ is the relative change in viscosity, in accordance with the equation $\eta_r - 1 = (\eta - \eta_s)/\eta_s$. The relative viscosity $\eta_r$ is the ratio of the viscosity $\eta$ of the solution under analysis to the viscosity $\eta_s$ of the pure solvent. (The physical definition of the Staudinger index is that of a specific hydrodynamic volume of the solvated polymer coil at infinite dilution and in the state of rest.) The unit commonly used for J is "cm³/g"; formerly often "dl/g".

The examples use the following abbreviations:
DGM diethylene glycol dimethyl ether
MIBK methyl isobutyl ketone
HAC hydroxyacetone (molar mass: 74 g/mol)
ACA acetyl acetone (molar mass: 100 g/mol)
ACE ethyl acetoacetate (molar mass: 130 g/mol)
MDE diethyl malonate (molar mass: 160 g/mol)
BO 2-butanone oxime (molar mass: 87 g/mol)
DMP 3,5-dimethylpyrazole (molar mass: 96 g/mol)
TMP trimethylolpropane (molar mass: 134 g/mol)
TDE triol prepared by reacting 1 mol of diethanolamine with 1 mol of ethylene carbonate (molar mass: 193 g/mol)

TDI tolylene diisocyanate (molar mass: 174 g/mol); commercially customary mixture containing approximately 80% 2,4-TDI and approximately 20% 2,6-TDI MDI diphenylmethanediisocyanate (molar mass: 250 g/mol)

HDI hexamethylene diisocyanate (molar mass: 168 g/mol)

By "perfectly water-dilutable" or "infinitely water-dilutable" is meant here that on gradual addition of water (up to about 10 times the mass of the resin solution employed) to the resin solution with stirring, no clouding or separation was observed.

Preparation of the Polycarboxyl Components

Component AI

A suitable reaction vessel was charged with a solution of 810 g (6 mol) of dimethylolpropionic acid in 946 g of DGM and 526 g of MIBK. A mixture of 870 g (5 mol) of TDI and 528 g (2 mol) of a TDI semiblocked with ethylene glycol monoethyl ether was added to this solution at the same time at 100° C. over the course of 4 hours. As soon as all the NCO groups had reacted, the batch was diluted to a mass fraction of solids of 60% with a mixture of DGM and MIBK (2:1). The component AI had an acid number of 140 mg/g and a Staudinger index $J_g$ ("intrinsic viscosity number"), measured in N,N-dimethylformamide (DMF) at 20° C., of 9.3 cm$^3$/g.

The semiblocked TDI was prepared by adding 90 g (1 mol) of ethylene glycol monoethyl ether to 174 g (1 mol) of TDI at 30° C. over the course of 2 hours followed by reaction until the mass fraction of NCO groups was from 16 to 17%.

Component AII

In the same way as for AI, 945 g (7 mol) of dimethylolpropionic acid were dissolved in 1079 g of DGM and 599 g of MIBK were reacted with 1044 g (6 mol) of TDI and 528 g (2 mol) of a TDI semiblocked with ethylene glycol monoethyl ether. The component AII had a mass fraction of solids of 60%, an acid number of 140 mg/g and a Staudinger index $J_g$ ("intrinsic viscosity number"), measured in N,N-dimethylformamide (DMF) at 20° C., of 10.2 cm$^3$/g.

Preparation of the Polyhydroxyl Components

Component BI

In a suitable reaction vessel, 130 g (1.1 mol) of 1,6-hexanediol, 82 g (0.6 mol) of monopentaerythritol, 8 g (0.05 mol) of isononanoic acid, 28 g (0.1 mol) of ricinenic fatty acid (dehydrated castor oil fatty acid) and 50 g (0.3 mol) of isophthalic acid were esterified at 210° C. to an acid number of less than 4 mg/g. The viscosity of a 50% strength solution in ethylene glycol monobutyl ether, measured as the efflux time in accordance with DIN 53211 at 20° C., was 125 seconds; the Staudinger index $J_g$ ("intrinsic viscosity number"), measured in N,N-dimethylformamide at 20° C., was 9.8 cm$^3$/g.

Component BII

In the same way as for BI, 38 g (0.2 mol) of tripropylene glycol, 125 g (1.2 mol) of neopentyl glycol, 28 g (0.1 mol) of isomerizied linoleic acid, 83 g (0.5 mol) of isophthalic acid and 58 g (0.3 mol) of trimellitic anhydride were esterified at 230° C. to an acid number of less than 4 mg/g. The viscosity of a 50% strength solution in ethylene glycol monobutyl ether, measured as the efflux time in accordance with DIN 53211 at 20° C., was 165 seconds. The Staudinger index $J_g$ ("intrinsic viscosity number"), measured in N,N-dimethylformamide at 20° C., was 10.5 cm$^3$/g.

Preparation of the Water-dilutable Polyesters AB

In accordance with the mass ratios indicated in table 1, the stated masses of the polycarboxyl component (A) and of the polyhydroxyl component (B) were mixed with one another and the solvent present was substantially removed under reduced pressure in the course of heating to the stated reaction temperature. This temperature was maintained until the desired acid number and Staudinger index as indicated in table 1 had been reached, at which point a sample was perfectly water-dilutable following neutralization with dimethylethanolamine. The components were processed further immediately in accordance with examples AB I and AB II.

TABLE 1

| | all mass figures refer to solids | | | | | |
|---|---|---|---|---|---|---|
| | Component A | | Component B | | | Acid |
| Reaction product | Mass in g | Type | Mass in g | Type | Reaction temperature[1] | number mg/g | $J_g$[2] cm$^3$/g |
| AB I | 35 | AI | 65 | BI | 150 to 160° C. | 41 to 45 | 16.7 |
| AB II | 30 | AII | 70 | BII | 150 to 160° C. | 35 to 39 | 16.0 |

[1]The reaction took place in approximately 90% strength solution in DGM
[2]Staudinger index, measured in N,N-dimethylformamide (DMF) at 20° C.

Water-dilutable Polyester AB III 140 g (1.3 mol) of diethylene glycol and 152 g (1.1 mol) of trimethylolpropane were weighed out into a 3-necked flask equipped with stirrer and reflux condenser. The mixture was heated to 100° C. with stirring, under inert gas, and at this temperature there were added, in portions, 109 g (0.6 mol) of isophthalic acid, 96 g (0.6 mol) of adipic acid and finally 198 g (1.3 mol) of phthalic anhydride. Utilizing the exotherm, the temperature was raised to 130° C. After the mixture had been held at 130° C. for 2 hours, it was slowly heated to 180° C. and esterified to an acid number of 50 mg/g with separation of the water of reaction then being produced. After it had reached the stated acid number, it was diluted with butyl glycol to a mass fraction of solids of 60% and finally was neutralized by adding 14 g (0.16 mol) of N,N-dimethylethanolamine. The resulting product was infinitely water-dilutable.

Preparation of the Curative Components

A 3-necked flask equipped with stirrer and reflux condenser was charged with a mixture of (in toto) 1 mol of the diisocyanates specified in table 2 and about 85 g of methyl isobutyl ketone. With stirring and at room temperature, 0.3 mol of the stated triol (trimethylol-propane or N,N-bishydroxyethyl-2-hydroxyethylurethane, obtainable by reacting ethylene carbonate and diethanolamine) was added to the mixture, after which the temperature was increased to 50° C., utilizing the exotherm. After all components had dissolved, the mixture was held at 50° C. for a further hour. Then 1.1 mol of the blocking agent were added dropwise over the course of one hour, during which the temperature rose exothermically to 80° C. With occasional cooling, this temperature was maintained until isocyanate groups were no longer detectable. Thereafter the methyl isobutyl ketone was distilled off under reduced pressure, and then the batch was diluted with methoxypropanol to a mass fraction of solids of from 60 to 70% (see table 2).

TABLE 2

Composition of the curatives

| Curative | Isocyanate | Triol (0.3 mol) | Blocking agent (1.1 mol) | Mass of curative in g | Mass fraction of solids in % | Viscosity at 23° C. in mPa · s | Specific* blocked NCO group content in mol/kg |
|---|---|---|---|---|---|---|---|
| H 1 | 1.0 mol TDI | TMP | BO | 310 | 70 | 2550 | 3.55 |
| H 2 | 1.0 mol TDI | TMP | ACA | 324 | 65 | 4312 | 3.40 |
| H 3 | 1.0 mol TDI | TMP | ACE |  | 70 | 1054 | 3.09 |
| H 4 | 1.0 mol TDI | TMP | MDE | 390 | 70 | 930 | 2.82 |
| H 5 | 1.0 mol TDI | TMP | HAC | 296 | 65 | 4815 | 3.72 |
| H 6 | 0.7 mol TDI<br>0.3 mol MDI | TDE | DMP | 364 | 60 | 4833 | 3.02 |
| H 7 | 1.0 mol TDI | TDE | DMP | 342 | 60 | 3601 | 3.22 |
| H 8 | 0.5 mol TDI<br>0.5 mol MDI | TDE | BO | 370 | 65 | 3865 | 2.98 |
| H 9 | 1.0 mol HDI | TMP | ACE | 351 | 65 | 644 | 3.13 |
| H 10 | 1.0 mol HDI | TMP | MDE | 384 | 65 | 510 | 2.87 |

*based on the mass of resin solids

Unpigmented clearcoat materials were formulated from the curatives H 1 to H 10 listed in table 2, in combination with the polyester resins AB I, AB II and AB III.

For this purpose the polyester resins were adjusted with dimethylethanolamine to a degree of neutralization of 100% at from 70 to 100° C. and were then diluted with deionized water to a supply-form viscosity of approximately 100 mPa.s. With thorough stirring the curative was then added slowly, after which stirring was continued for 5 minutes. The ratio of the masses of polyester and curative was set in all cases at 70:30 (based in each case on resin solids). After mixing, further water was added to establish a viscosity in the range from 400 to 600 mPa·s.

The resulting clearcoat materials were drawn down onto cold-rolled thin sheet metal, using a drawing cube so as to give a dry film thickness of approximately 20 μm. The results of technical paint testing are summarized in table 3. The coatings displayed good hardness even at relatively low baking temperatures.

group carries a double bond, oximes C22 of linear, branched or cyclic aliphatic ketones having 3 to 15 carbon atoms, CH-acidic compounds C23, in which the carbon atom which carries the active hydrogen carries at least one further group selected from $R^1$—CO—, $R^2$—O—CO—, —$NO_2$ and $R^3$—$SO_2$—, $R^1$, $R^2$ and $R^3$ independently of one another being selected from the group consisting of linear, branched or cyclic alkyl groups having 1 to 18 carbon atoms or aryl groups having 5 to 15 carbon atoms, and NH-acidic compounds C24.

2. The aqueous two-component binder system as claimed in claim 1, wherein the water-dilutable polyesters AB are prepared by polycondensation of polyfunctional, especially difunctional, organic hydroxy compounds AB1 and polyfunctional, especially difunctional, organic acids AB2.

3. The aqueous two-component binder system as claimed in claim 1, wherein the water-dilutable polyesters AB are prepared by partial condensation of hydroxyl group-containing compounds B which per se are insoluble in water

TABLE 3

Results of the technical coatings tests

| Coating material | L1 | L2 | L3 | L4 | L5 | L6 | L7 | L8 | L9 | L10 | L11 |
|---|---|---|---|---|---|---|---|---|---|---|---|
| Curative | H1 | H4 | H3 | H5 | H6 | H7 | H8 | H9 | H10 | H5 | H3 |
| Polyester | AB III | AB III | AB I | AB II | AB I | AB III | AB II | AB III | AB III | AB I | AB III |
| Film thickness (dry) in μm | 18 | 20 | 20 | 19 | 21 | 22 |  | 20 | 18 | 20 | 20 |
| Baking temperature in ° C. | 110 | 110 | 110 | 110 | 110 | 110 | 110 | 110 | 110 | 110 | 110 |
| Cross-hatch | Gt 0 | Gt 0 | Gt 0 | Gt 0 | Gt 1 | Gt 0 | Gt 1 | Gt 0 | Gt 0 | Gt 0 | Gt 0 |
| Pendulum hardness (König) in s | 90 | 95 | 133 | 123 | 144 | 125 | 143 | 88 | 93 | 133 | 107 |

The "cross-hatch" evaluation is made in accordance with the standard DIN 53 151.

What is claimed is:

1. An aqueous two-component binder system, its first component comprising a water-dilutable polyester AB having a hydroxyl number of at least 10 mg/g and its second component consisting of a blocked polyfunctional water-insoluble isocyanate C, wherein the blocked isocyanate C is prepared by reaction of an aromatic isocyanate C1 and a blocking agent C2 for the isocyanate, C2 being selected from primary alcohols C21 having 3 to 10 carbon atoms, in which the carbon atom adjacent to the hydroxymethylene group carries a double bond, oximes C22 of linear, branched with organic compounds A containing acid groups, especially carboxyl groups, the reaction of the compounds A and B being conducted to a point where the resulting condensation product AB still contains both hydroxyl groups and acid groups.

4. The aqueous two-component binder system as claimed in claim 1, wherein the amount of the acid groups in AB corresponds to an acid number of from 10 to 60 mg/g.

5. The aqueous two-component binder system as claimed in claim 1, wherein the amount of the hydroxyl groups in AB corresponds to a hydroxyl number of at least 15 mg/g.

6. The aqueous two-component binder system as claimed in claim 1, wherein the polycondensate AB has a Staudinger index $J_g$ of from 5 to 25 cm$^3$/g.

7. The aqueous two-component binder system as claimed in claim 3, wherein the compounds AB are per se dispersible in water or soluble in water following at least partial neutralization of the acid groups.

8. The aqueous two-component binder system as claimed in claim 1, wherein 3,5-dimethylpyrazole is used as blocking agent C24.

9. An aqueous coating material which comprises a two-component binder system as claimed in claim 1.

10. The aqueous coating material as claimed in claim 9, further comprising water-soluble amino resins as an additional curative component.

* * * * *